United States Patent [19]

Shahir et al.

[11] Patent Number: 5,555,105

[45] Date of Patent: Sep. 10, 1996

[54] BUSINESS CARD IMAGE COPIER

[76] Inventors: Fred A. Shahir, 629 Kendale La., Thousand Oaks, Calif. 91360; Frank K. Sohaei, 7172 Tern Pl., Carlsband, Calif. 92009

[21] Appl. No.: 954,168

[22] Filed: Sep. 29, 1992

[51] Int. Cl.$^6$ .................................................. H04N 1/24
[52] U.S. Cl. ........................ 358/473; 358/472; 358/158
[58] Field of Search .................................. 358/403, 404, 358/447, 473, 382, 472, 158

[56] References Cited

U.S. PATENT DOCUMENTS

| | | | |
|---|---|---|---|
| 4,264,808 | 4/1981 | Owens et al. | 235/379 |
| 4,468,755 | 8/1984 | Iida | 364/900 |
| 4,604,653 | 8/1986 | Shimizu | 358/256 |
| 4,684,998 | 8/1987 | Tanioka et al. | 358/293 |
| 4,816,921 | 3/1989 | Akiyama | 358/256 |
| 4,876,613 | 10/1989 | Honda | 358/471 |
| 4,943,868 | 7/1990 | Yoshinaga et al. | 358/403 |
| 5,278,673 | 1/1994 | Scapa et al. | 358/473 |
| 5,311,208 | 5/1994 | Burger et al. | 358/163 |
| 5,355,146 | 10/1994 | Chiu et al. | 358/156 |

*Primary Examiner*—Bernard Roskoski
*Attorney, Agent, or Firm*—Stetina Brunda & Buyan

[57] ABSTRACT

A hand-held business card image copier is disclosed which includes an image scanner for generating electronic digitized image of a business card. A keypad is provided for assigning identification data to the digitized image. A memory controller is provided for storing the digitized image and assigned identification data. An electronic display is operative to display the digitized image as it is copied, or recalled from memory.

4 Claims, 2 Drawing Sheets

BUSINESS CARD IMAGE COPIER

FIELD OF THE INVENTION

The present invention relates to a business directory and, more particularly, a directory for storing and retrieving information set forth on conventional business cards. In the embodiments described herein relates to a hand-held device sized to fit in a shirt pocket.

BACKGROUND OF THE INVENTION

A variety of different types of electronic calendars and directories are available from commercial sources. Such devices include telephone directories and appointment calendars. These devices are a highly useful alternative to conventional paper directories and calendars. Such electronic devices serve as portable reminders for a variety of different types of information contributing to efficiency and availability of information to the user.

However, the many advantages of such contemporary devices are offset by difficulties associated with the manner in which the information is input to the device. A user must typically enter each letter and number of the stored information using small alpha-numeric keys. Such information may include the name of a business, information concerning the nature of the business, his or her position, the company, the business address, the business voice phone number and the business facsimile phone number. In view of the extent of such information, the user may well decide, out of convenience or out of necessity, to enter only portions of the information, leaving other important items unrecorded.

The present invention recognizes that many, if not all of such important items of information are frequently printed on business cards. A recording of all such information on a business card. A recordable record of a person or company may readily be kept for later reference. Moreover, the present invention permits such a record to be generated and stored with significantly less effort than necessary to enter such information manually using conventional devices.

SUMMARY OF THE INVENTION

A hand-held business card image copier is disclosed which includes an image scanner for generating electronic digitized image of a business card. A keypad is provided for assigning identification data to the digitized image. A memory controller is provided for storing the digitized image and assigned identification data. An electronic display is operative to display the digitized image as it is copied, or recalled from memory.

In the presently preferred embodiment an image scanner includes a hand scanner for reading image data on the business card by manually moving the hand scanner.

An encoder is preferably provided for synchronizing movement of the image scanner and storage of the digitized data.

In the presently preferred embodiment the image scanner is operative to generate digitized data in the form of a bit map corresponding to the alpha-numerics and images on the face of the business card being copied.

The business card image copier is contained in a portable housing having a surface area substantially conforming to the surface area of a business card.

DETAILED DESCRIPTION OF THE PREFERRED EMBODIMENT

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

In general, the figures depict a business card image copier which receives and records information maintained on business cards. A business card may be inserted within the device, copied by operation by manually manipulating a scanner device to electronically encode the information on the business card into a bit map stored in the device memory. The information may be manually indexed with a minimal amount of information, e.g., last name or company name.

Because the information is stored in bit map form, alpha-numeric image and graphic image may each be input and retrieved for display. The information comprising the bit map may alternately be output to external devices where the information may be displayed, manipulated, or otherwise processed as desired.

Figure 1:
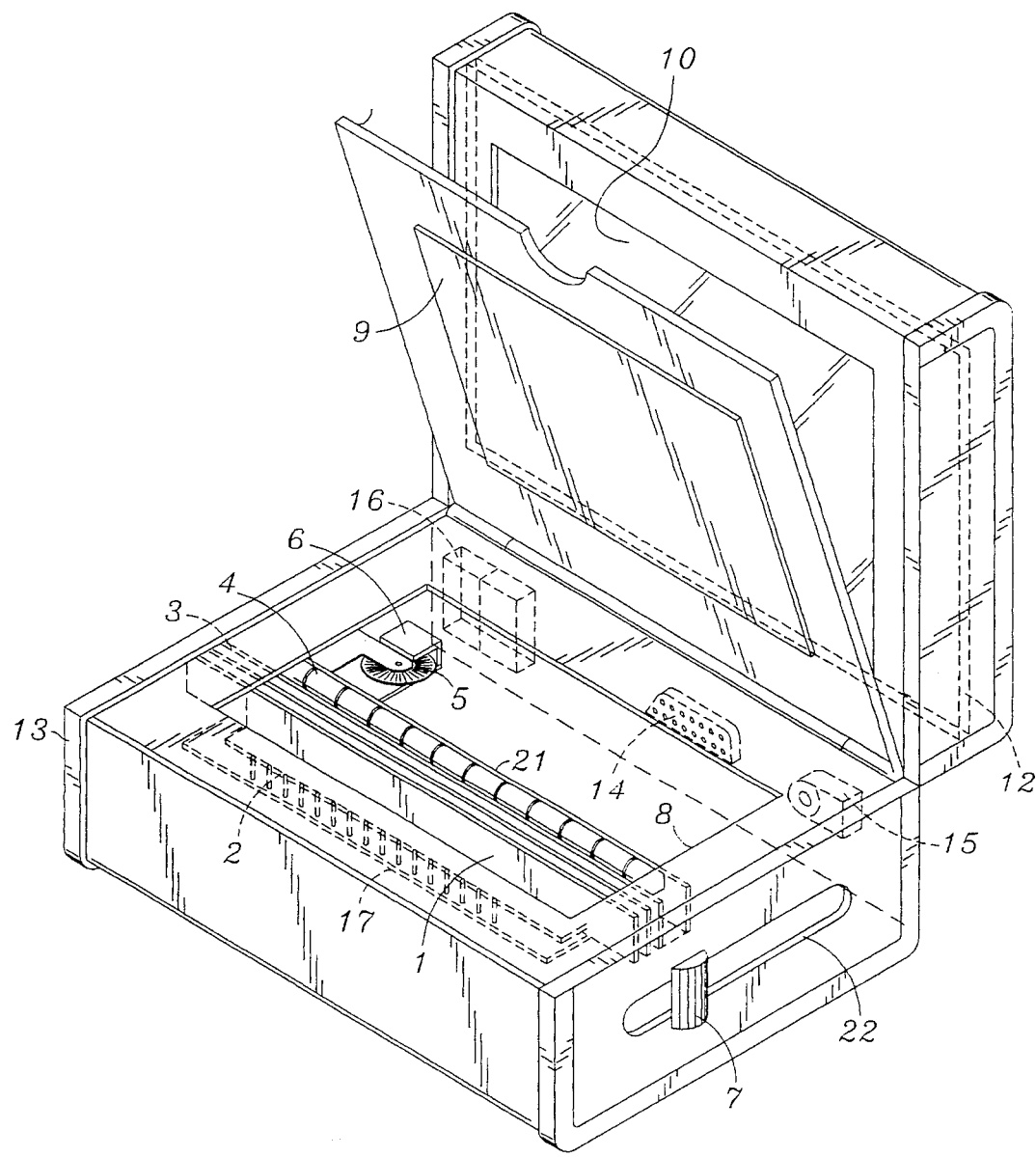
FIG. 1 is a perspective view of a business card image copier in accordance with the present invention.
Figure 2:
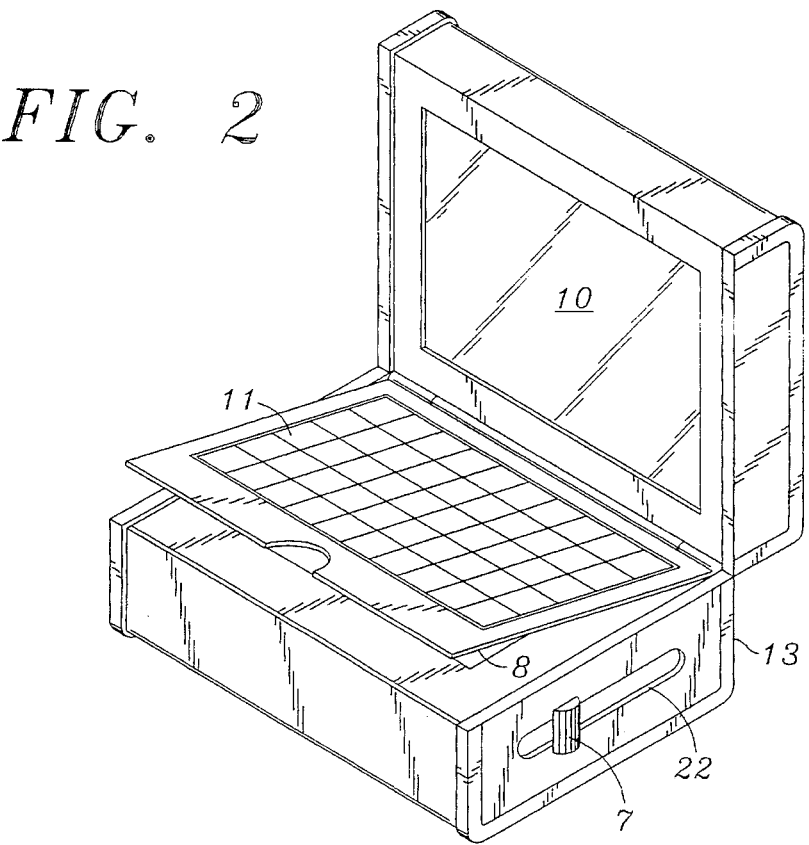
FIG. 2 is a perspective view of the device shown in FIG. 1, further illustrating components thereof.

Referring to FIGS. 1 and 2, the components of the illustrated device are as follows.

Image scanner sliding module 1 contains all the components associated with the scanner copier head 21. The scanner copier head 21 is a moving head which travels the entire scan which travels the scan sliding slot 22 that is slightly larger than the width of a conventional business card. The scanner copier head 21 rides in a precision slot rail which provides proper moving scan position in relation to image sensors and optics.

The image sensor 2 is preferably a CCD contact type linear image sensor located beneath the rod lens array image projector 3. The sensor 2 is a linear light sensitive sensor which provides a series of signals representing the image detected.

LED array light source rod 4 illuminates scanning area. The rod lens array image projector 3 is positioned between the scanner window 8 and the image sensor 2. The image projector 3 moves with the scanner copier head such that a light beam is projected towards the image (business card) through a series of rod form lenses providing proper focusing in image envelope. The light reflected from the image is received upon the image sensor 2.

Rotary encoder module 5 is a scan/speed encoder device fixed to the scanner copier head 21. The rotary encoder module provides a train of pulses for triggering CCD sensor to driver circuitry and memory controller logic disposed on memory controller PC board 12. The digitization and storage of the business card is thereby synchronized with the movement of the image scanner sliding module 1. Pulses from the rotary encoder module 5 act as a positive indication of the scanning and copying process.

Photocell encoder pulse generator 6 receives the pulses generated by the rotary encoder module 5 translates those pulses to information representative of the movement of the scanner copier head.

Scanner slider knob 7 extends from the scanner copier head 21. In use the scanner slider knob 7 is manually manipulated in order to effect movement of the scanner copier head 21. Copier window glass 8 is a fixed glass, or similar clear transparent sheet, used to provide rigid and even area for positioning business cards.

Copy pad cushion 9 provides a soft pad against the card to be copied, and provides sufficient pressure to insure that card edges remain evenly in contact with the scan window 8.

LCD monitor display screen 10 provides a display for reviewing the information scanned by the scanner copier head 21. The display screen 10 provides a reproduction of each business card image, including alpha-numerics and graphics. In the presently preferred embodiment to display screen 10 approximately twice the side of a card. However, it is to be understood that the size and nature of display screen may be modified without departing from the broader aspects of the invention. The display screen 10 provides display for information recalled from the device, and may also display information generated by the microprocessor and other associated software.

Membrane keyboard pad 11 is a membrane switch which is padded with a solid sheet to provide rigid support for the copy pad cushion. The membrane keyboard 11 operates as a control keyboard for assigning identification data to the digitized image, to facilitate data entry and retrieval. Thus, though the membrane keyboard pad 11 is useful to index the information represented in the bit map, the information itself need not be entered via the keyboard pad 11.

Memory controller PC board 12 is implemented as a microprocessor and associated control circuitry and memory circuitry. Memory controller PC board 12 also incorporates LCD drive circuitry to coordinate manual movement of the scanner copier head 21 with electronic operation of the LED rod 4, photocell encoder pulse generator 6 and CCD sensor 2. The memory controller PC board 12 operates to control the scanning, storing and retrieving function of the device. Case or housing 13 is the outer enclosure within which the device fits. The case 13 is preferably designed for portability and desktop functioning. In the presently preferred embodiment, the case 13 is miniaturized to be easily fitted within a coat pocket.

Data transfer I/O port 14 provides a connection to facilitate communication between the device and external personal computer or other data processing device. Though the present invention may operate as a stand-alone system, without requiring a data transfer I/O port connection, it can also be connected to a personal computer for downloading or uploading data relevant to the content or indexing of the information incorporated into the bit map.

Power source connection 15 provides means to operate the device from an AC source. Alternately, the device may be operated through rechargeable batteries or a DC adapter.

Power switch 16 provides an on/off function to the device. Preferably all circuitry within the device may be initialized to a standby position when the power switch 16 is turned on. The supply for the light source LED driver array is activated when the scan command is detected by the encoder module 5.

Scanner image module electronics PC board 17 operates to convert the analog signal generated by CD sensor 2 to a digital data stream corresponding to scanning lines. Upon completion of the analog to digital conversion the information received from the CCD sensor 2 is in a condition to be stored in a memory location through membrane keyboard pad 11. In the presently preferred embodiment, the driving circuitry for the CCD sensor 2 may also be implemented in the PC board 17.

In practice, a business card may be placed on the scanning/copying window 8 with membrane keyboard pad 11 closed over the card. The copy pad cushion 9 insures proper positioning of the card ready for image scanning. While indexing or initializing of input information may be done through membrane keyboard pad 11 before or after information is read from the business card.

In the presently preferred embodiment, it is only necessary to move the scanner sliding knob 7 forward a single time to complete the process of copying. The entire image on the card will; then be electronically detected by the CCD sensor 2. The LED array light source 4 lights up the scanning area and, upon reflection of light beams, the rod lens array image projector 3 focuses the image onto the CCD sensor 2. The analog video signal provided by the CCD sensor 2 is converted into a series of digital signals by the circuitry on scanner image module electronics PC board 17. Digitized signal is then ready for storage in the memory electronics PC board 17. Digital business card data can then be retrieved whenever there is a need for display.

To display the stored digital the LCD monitor display screen 10 may be activated by entering the information on the membrane keyboard pad 11. All data and the associated memory location will then be displayed on the screen. If there is a need to print or transfer data to an external device, the stored information may be transferred via data transfer I/O port PC connection 14. An application program written for controlling purposes utilize to provide a communication link between the device and an external computer.

Figure 3:
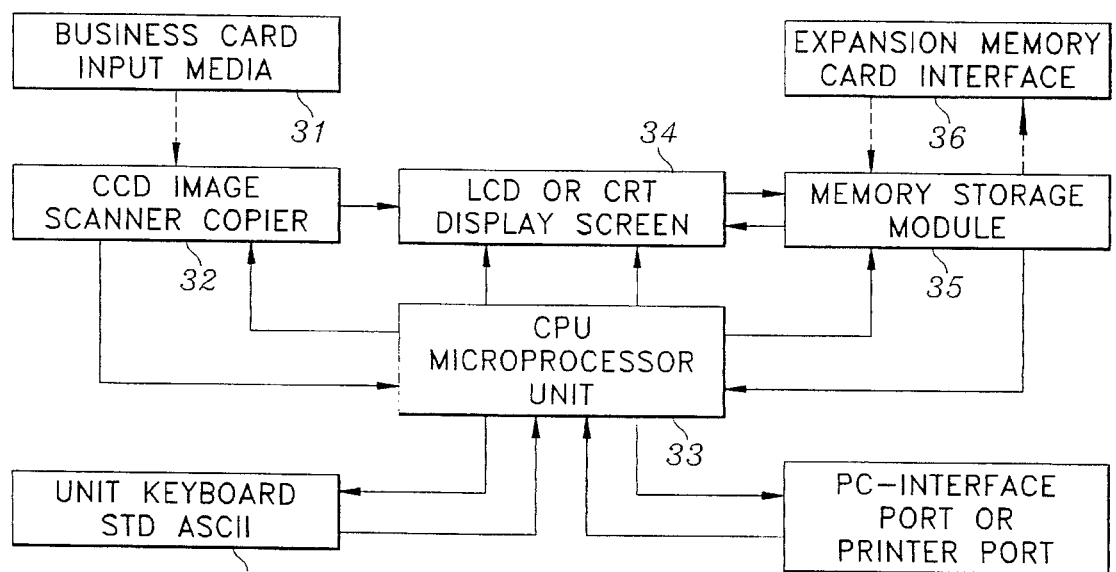
FIG. 3 is a block diagram illustrating electrical operation of the device shown in FIG. 1.

FIG. 3 is a block diagram illustrating the basic electronic functions of the present invention. As shown therein, CCD image scanner 32, under control from microprocessor unit 33, operates to sense information on business card 31. That information may then be displayed on display screen 34 and also stored at an addressable location within memory storage module 35. The capacity of memory storage module 35 may be supplemented by use of expansion memory card interface 36.

Keyboard 37 is operative to index or recall the image scanned by scanner 32 and stored in memory storage module 35. PC interface port 38 is typically a serial port operative to communicate information to and from an external device such as a personal computer.

What is claimed is:

1. A hand-held business card image copier comprising:

an image scanner module for generating an electronic digitized image of a business card;

a keyboard pad for assigning identification data to the digitized image; a memory controller for storing the digitized image and assigned identification data;

a display screen for depicting the digitized image;

said scanner module, keyboard pad, controller and display screen being contained in a portable housing having a surface area substantially conforming to the surface area of the business card said keyboard pad, said display and said scanner being rotably interconnected and wherein said keyboard pad is rotatable to cover the business card after said card is placed within the housing.

2. The business image copier as recited in claim 1 wherein said image scanner module includes a manual scanner for reading image data on a business card by manual movement thereof.

3. The business image copier as recited in claim 1 further comprising an encoder for synchronizing movement of the image scanner module and storage of the digitized data.

4. The business image copier as recited in claim 1 wherein said digitized data is in the form of a bit map.

* * * * *